United States Patent [19]

Masuda

[11] 4,116,411
[45] Sep. 26, 1978

[54] DEVICE FOR SUSPENDING AN EXHAUST PIPE IN VEHICLES

[75] Inventor: Hidemi Masuda, Toyota, Japan

[73] Assignee: Toyota Jidosha Kogyo Kabushiki Kaisha, Toyota, Japan

[21] Appl. No.: 745,438

[22] Filed: Nov. 26, 1976

[30] Foreign Application Priority Data

Sep. 17, 1976 [JP] Japan .......................... 51-125552[U]

[51] Int. Cl.² .............................................. F16L 3/00
[52] U.S. Cl. .................................... 248/60; 180/64 A
[58] Field of Search ................... 248/54 R, 58, 60, 62, 248/358 R, 15, 18, 374, 373, 375; 180/64 A; 267/69

[56] References Cited

U.S. PATENT DOCUMENTS

| 1,470,493 | 10/1923 | Show | 248/18 X |
|---|---|---|---|
| 1,703,765 | 2/1929 | Duffy | 248/358 R X |
| 1,720,545 | 7/1929 | Dickey | 248/358 R X |
| 1,962,585 | 6/1934 | Faure-Roux | 267/63 R |
| 2,171,441 | 8/1939 | Barry | 248/358 R X |
| 2,440,670 | 4/1948 | Kaemmerling | 248/358R |
| 2,760,747 | 8/1956 | Mordarski | 248/358 R |
| 3,107,890 | 10/1963 | Parks | 248/358 R |
| 3,204,901 | 9/1965 | Dunn | 248/60 X |
| 3,960,232 | 6/1976 | Hubbell | 248/54 R X |

FOREIGN PATENT DOCUMENTS

| 2,206,750 | 8/1973 | Fed. Rep. of Germany | 248/60 |
|---|---|---|---|
| 539,485 | 9/1941 | United Kingdom | 248/358 R |
| 924,028 | 4/1963 | United Kingdom | 248/54 R |

*Primary Examiner*—Rodney H. Bonck
*Attorney, Agent, or Firm*—Stevens, Davis, Miller & Mosher

[57] ABSTRACT

A device for suspending an exhaust pipe in vehicles having first and second rod members connected by a rubber-like elastic block element with hooked end portions of the rod members being received in individual holes formed in the block element, wherein the two hooked end portions of the rod members are arranged not to be parallel with each other.

5 Claims, 5 Drawing Figures

DEVICE FOR SUSPENDING AN EXHAUST PIPE IN VEHICLES

BACKGROUND OF THE INVENTION

1. Field of the Invention

The present invention relates to a device for suspending an exhaust pipe under the floor of vehicles.

2. Description of the Prior Art

The exhaust pipe mounted under the floor of a vehicle such as an automobile is generally suspended by a flexible suspension device so as to impede the transmission of the engine vibration to the floor of the passenger compartment through the exhaust pipe and to allow for a smooth thermal expansion of the exhaust pipe, since otherwise it will cause an unpleasant humming or an undue thermal stress in the pipe or the suspension means. Among such devices for flexibly suspending exhaust pipes in vehicles there is known a device comprising a first rod member having a hooked end portion and mounted to a frame of the vehicle, a second rod member having a hooked end portion and mounted to the exhaust pipe and a block element made of a rubber-like elastic material having two holes each receiving one of the two hooked end portions of said first and second rod members. This conventional device is very simple in structure and yet accomplishes the purpose of providing a flexible suspension which isolates transmission of vibration and heat. However, in conventional devices of this type, the hooked end portions of the first and second rod members are generally arranged to be straight and parallel with each other and, consequently, the block element can easily rotate around the hooked end portion of the first or second rod member when the vehicle body sways in driving thereby causing a swinging motion of the exhaust pipe or even bumping of the exhaust pipe against adjacent structures or members which will generate an abnormal sound or cause damage to the exhaust pipe or the adjacent structures or members. These problems may be avoided by providing a proper detent means between the rod members and the block element or by bonding the hooked end portions to the block element. However, these methods will increase the number of parts or will require additional work thereby increasing the manufacturing cost and will reduce the principal advantage of the simple suspension device of the aforementioned type.

SUMMARY OF THE INVENTION

It is therefore an object of the present invention to provide an improved device for suspending an exhaust pipe in vehicles of the aforementioned type in which the aforementioned drawbacks are obviated without complicating the structure, increasing the number of parts or cost of manufacture.

According to the present invention, the above-mentioned object is accomplished by a device for suspending an exhaust pipe in vehicles comprising a first rod member having a hooked end portion and mounted to the frame of the vehicle, a second rod member having a hooked end portion and mounted to the exhaust pipe, and a block element made of a rubber-like elastic material having two holes each receiving one of said hooked end portions of said first and second rod members, wherein said two hooked end portions are arranged not to be parallel with each other.

By this arrangement, a tilting or rotational movement of the block element around the hooked end portions of the first and second rod members effected by a parallel relative movement of the two hooked end portions is greatly impeded and, consequently, the freedom of the swing movement of the suspension device is greatly restricted so that the swinging motion of the exhaust pipe due to vibration of the vehicle body is substantially avoided.

The non-parallel arrangement of said two hooked end portions is accomplished by forming at least one of said two hooked end portions in a non-straight figure such as a curved or bent figure or by arranging a straight hooked end portion as inclined relative to the other straight hooked end portion.

BRIEF DESCRIPTION OF THE DRAWING

In the accompanying drawing.

DESCRIPTION OF THE PREFERRED EMBODIMENT

In the following the invention will be described in more detail with reference to the accompanying drawings.

Figure 1:
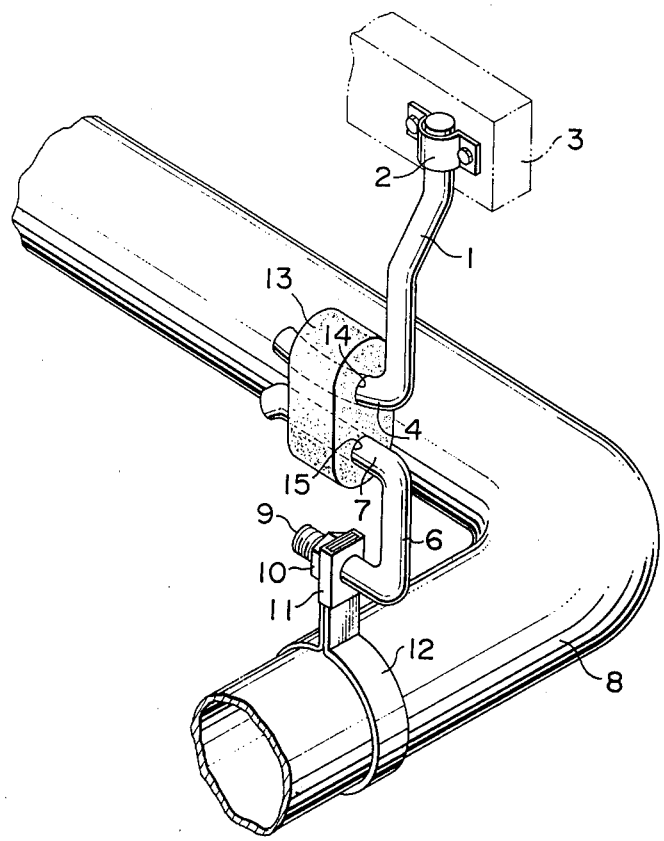
FIG. 1 is a perspective view of an embodiment of a device for suspending an exhaust pipe in vehicles according to the present invention.

Referring to FIG. 1, 1 designates a first rod member which is mounted by a bracket 2 to a frame 3 of a vehicle (not shown) and is formed with a hooked end portion 4 at a lower end portion thereof. 6 designates a second rod member which is formed with a hooked end portion 7 at its upper end portion and is mounted to an exhaust pipe 8 at its lower end portion. In more detail, the lower end portion of the rod member 6 is formed with a threaded portion 9 and has a mounting piece 11 attached thereto by welding or other mounting means and is adapted to support opposite ends of a clamp belt 12 by clamping the ends between the mounting piece 11 and a nut 10 screwed onto the threaded portion 9, said clamp surrounding the exhaust pipe 8. 13 designates a block element which is made of a rubber-like elastic material such as rubber or the like and has a somewhat eliptical shape as viewed from one side. The block element is formed with two holes 14 and 15 in which the hooked end portions 4 and 7 of the rod member 1 and 6 are engaged, respectively, thereby connecting the two rod members with each other in a manner so that an elastic cushioning means is interposed therebetween.

Figure 2:
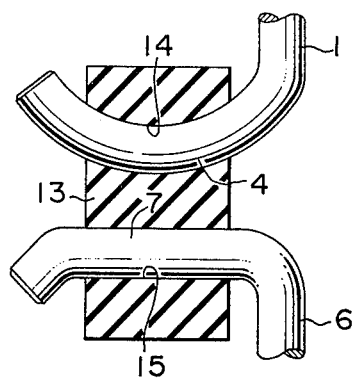
FIG. 2 is an enlarged vertical sectional view of an essential portion of the device shown in FIG. 1, and FIGS. 3–5 are views similar to FIG. 2, showing other embodiments of the present invention.

In this case, as better shown in FIG. 2, the hooked end portion 4 engaging the hole 14 is curved in the form of an arc so as to be non-parallel to the other hooked end portion 7 engaged into the hole 15. The hole 14 should preferably be formed beforehand in a curved figure corresponding to that of the hooked end portion 4. In this structure, rotation of the block element 13 around the hooked end portion 4 is greatly impeded by the curved engagement between the curved hooked end portion 4 and the curved hole 14, whereby relative swinging displacement between the two rod members 1 and 6 is substantially avoided.

Figure 3:
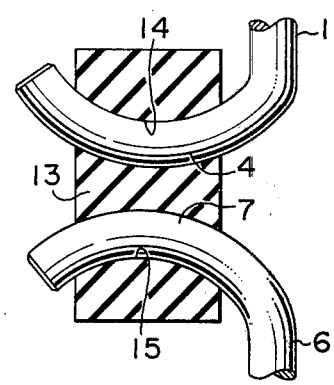

In the embodiment shown in FIG. 3, the hooked end portion 7 is also curved in the shape of an arc substantially opposite to the curved shape of the hooked end portion 4. This structure will provide a more rigid connection between the two rod members with regard to relative swinging movment therebetween.

Figure 4:
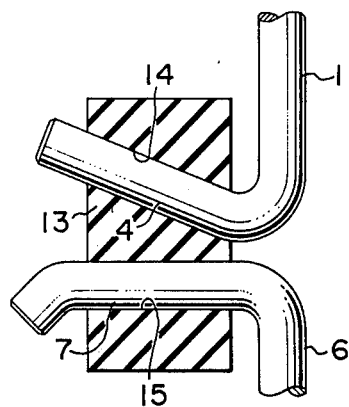

The non-parallel arrangement of the two hooked end portions can also be obtained by employing two straight hooked end portions, if the two hooked end portions are arranged not to be parallel with each other in a simpler geometrical sense as exemplarily shown in FIG. 4.

Figure 5:
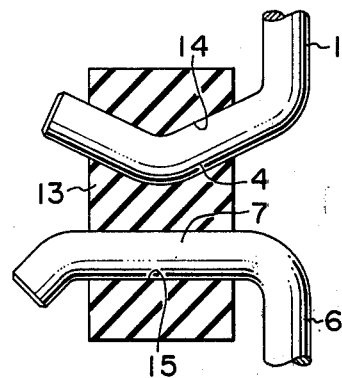

FIG. 5, shows still another embodiment of the invention, wherein one of the hooked end portions has two bends. The embodiment shown in FIG. 5 will have substantially the same performance as the embodiment shown in FIG. 2.

Although the invention has been described with reference to some particular embodiments thereof, it will be understood by those skilled in the art that various modifications other than those herein shown are possible without departing from the spirit of the invention.

I claim:

1. A device for suspending an exhaust pipe in a vehicle having a frame and an exhaust pipe, comprising first and second rod members each having a substantially uniform and circular cross-section and being formed with a hooked portion at one end thereof, a first mounting means to mount the other end of said first rod member to said frame, a second mounting means to mount the other end of said second rod member to said exhaust pipe, and a block element made of a rubber-like elastic material having two holes therethrough, each hole having a substantially uniform and circular cross-section corresponding to said rod members and receiving one of said hooked portions of said first and second rod members in a simple substantially circular peripheral surface engagement with no bonding means being applied between said block and said hooked portions, said two holes and hooked portions being positioned so as not to be parallel with each other and so as to be substantially in the same plane.

2. The device of claim 1 wherein the two holes and hooked portions lie in the same vertical plane.

3. The device of claim 1 wherein at least one of said two holes and one of said two hooked portions are correspondingly curved in the shape of an arc.

4. The device of claim 1 wherein at least one of said two holes and one of said two hooked portions are correspondingly bent at a portion located in said hole.

5. The device of claim 1 wherein said two holes and the rod portions located therein are straight.

* * * * *